(12) United States Patent
Makino et al.

(10) Patent No.: US 8,731,799 B2
(45) Date of Patent: May 20, 2014

(54) PRE-IGNITION ESTIMATION/CONTROL DEVICE FOR AN INTERNAL COMBUSTION ENGINE

(75) Inventors: Tomokazu Makino, Tokyo (JP); Hideki Hagari, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 627 days.

(21) Appl. No.: 13/081,061

(22) Filed: Apr. 6, 2011

(65) Prior Publication Data

US 2012/0089315 A1    Apr. 12, 2012

(30) Foreign Application Priority Data

Oct. 8, 2010  (JP) .................................. 2010-228424

(51) Int. Cl.
  *F02D 13/06*  (2006.01)
  *F02D 43/00*  (2006.01)
  *F02D 45/00*  (2006.01)

(52) U.S. Cl.
  USPC ........................................................ 701/102

(58) Field of Classification Search
  USPC .......... 701/102, 101, 103, 111; 123/435, 436, 123/406.19, 406.47, 406.45
  See application file for complete search history.

(56) References Cited

U.S. PATENT DOCUMENTS

| 8,073,613 B2 * | 12/2011 | Rollinger et al. ............. 701/103 |
| 8,156,923 B2 * | 4/2012 | Lorenz et al. ............. 123/406.45 |
| 8,463,533 B2 * | 6/2013 | Glugla et al. .................. 701/111 |

FOREIGN PATENT DOCUMENTS

| JP | 2005-76466 A | 3/2005 |
| JP | 2009-114973 A | 5/2009 |
| JP | 2010-209728 A | 9/2010 |

* cited by examiner

*Primary Examiner* — Hieu T Vo
(74) *Attorney, Agent, or Firm* — Sughrue Mion, PLLC

(57) ABSTRACT

A pre-ignition estimation/control device includes: an octane number estimation module for estimating an octane number of a fuel based on detection signals received from an intake air temperature sensor, a water temperature sensor, etc; a pre-ignition-occurrence-index calculation module for calculating a pre-ignition occurrence index based on the estimated octane number and the like; a pre-ignition-occurrence-index correction module for correcting the pre-ignition occurrence index so as to cause the pre-ignition more likely to occur; an effective-compression-ratio-boundary calculation module for calculating a boundary of an effective compression ratio based on the pre-ignition occurrence index; an intake-cam-phase-advance calculation module for calculating a phase advance of an intake cam based on the boundary of the effective compression ratio and the like; and an intake-cam-phase control module for controlling an intake-cam variable phasing system based on the phase advance of the intake cam, to thereby restrict a change in phase advance.

11 Claims, 11 Drawing Sheets

FIG. 7

| INTAKE AIR TEMPERATURE[°C] | 20 | 30 | 40 | 50 | 60 |
|---|---|---|---|---|---|
| PRE-IGNITION OCCURRENCE INDEX | −10 | −5 | 0 | 10 | 20 |

FIG. 8

| WATER TEMPERATURE[°C] | 80 | 90 | 100 | 110 | 120 |
|---|---|---|---|---|---|
| PRE-IGNITION OCCURRENCE INDEX | −10 | 0 | 10 | 15 | 20 |

FIG. 9

| OCTANE NUMBER[Ron] | 80 | 85 | 90 | 95 | 100 |
|---|---|---|---|---|---|
| PRE-IGNITION OCCURRENCE INDEX | 20 | 10 | 0 | 0 | −5 |

FIG. 10

| CONDITION | CONDITION THAT CAUSES PRE-IGNITION LESS LIKELY TO OCCUR | CONDITION THAT CAUSES PRE-IGNITION LIKELY TO OCCUR |
|---|---|---|
| PRE-IGNITION OCCURRENCE INDEX | −30 | 60 |
| BOUNDARY OF EFFECTIVE COMPRESSION RATIO | 20 | 8 |

FIG. 13

|  |  | ROTATION SPEED Ne[r/min] | | | |
|---|---|---|---|---|---|
|  |  | 1000 | 2000 | 4000 | 6000 |
| THROTTLE OPENING [%] | 0 | 0 | 0 | 0 | 0 |
|  | 20 | 0 | 20 | 10 | 10 |
|  | 40 | 0 | 20 | 20 | 20 |
|  | 60 | 0 | 20 | 30 | 30 |
|  | 80 | 10 | 30 | 50 | 40 |
|  | 100 | 10 | 30 | 40 | 40 |

| BOUNDARY OF EFFECTIVE COMPRESSION RATIO | 20 | 8 |
|---|---|---|
| RESTRICTION VALUE IMPOSED ON PHASE ADVANCE OF INTAKE CAM | 50 | 0 |

PRE-IGNITION ESTIMATION/CONTROL DEVICE FOR AN INTERNAL COMBUSTION ENGINE

BACKGROUND OF THE INVENTION

1. Field of the Invention

The present invention relates to a pre-ignition estimation/control device for an internal combustion engine, which is installed on a vehicle or the like and can prevent pre-ignition.

2. Description of the Related Art

Pre-ignition causing combustion noises and fluctuations in output may occur in a high-compression-ratio spark-ignition internal combustion engine. The pre-ignition refers to a phenomenon of an excessively large fluctuation in pressure inside a combustion chamber of an internal combustion engine, which results from combustion. Pre-ignition which occurs before the spark ignition is generally known. In addition to this type of pre-ignition, there are phenomena including pre-ignition in which a mixture (mixed gas of the air and a fuel) in the combustion chamber reaches high temperature by compression and is auto-ignited, and pre-ignition in which a deposit or the like at a tip of a spark plug forms a hot spot and causes ignition. Moreover, there is known a knock in which an end gas at a periphery of the combustion chamber is auto-ignited in the combustion process after the ignition.

These phenomena cause noises and vibrations as well as damages in the combustion chamber of the internal combustion engine, and the internal combustion engine may finally become no longer operable.

To address this, methods of estimating occurrence of pre-ignition based on environmental conditions and operation conditions, thereby preventing the pre-ignition, have conventionally been proposed.

In a conventional method of preventing the pre-ignition, pre-ignition, which occurs at low rotation speed, under a high load, and at high temperature, is determined based on the temperature and operation states of the internal combustion engine, and an effective compression ratio is reduced as the temperature increases, thereby preventing the pre-ignition (refer to Japanese Patent Application Laid-open No. 2005-76466, for example).

Moreover, in another conventional method of preventing the pre-ignition, the octane number of a fuel is estimated, and a likelihood of occurrence of the pre-ignition is determined based on the estimated octane number of the fuel, thereby preventing the pre-ignition on startup by decreasing the effective compression ratio on the startup according to the environmental temperature of the internal combustion engine (refer to Japanese Patent Application Laid-open No. 2009-114973, for example).

Japanese Patent Application Laid-open No. 2005-76466 describes that the pre-ignition is prevented by decreasing the effective compression ratio according to the increase in the temperature of the internal combustion engine. However, causes of the occurrence of the pre-ignition include fuel properties in addition to the temperature in the internal combustion engine and the increase in temperature caused by the compression in the combustion chamber, and it is known that the pre-ignition occurs more frequently as the octane number of the fuel becomes low.

In view of the above, even in a case where the environmental temperature of an intake air to be introduced into the combustion chamber as an ambient temperature around the internal combustion engine, for example) is low, if the octane number of the fuel is low, pre-ignition possibly occurs. The opposite holds true, and even if the octane number is high, high environmental temperature possibly causes pre-ignition.

Japanese Patent Application Laid-open No. 2009-114973 describes that a likelihood of occurrence of the pre-ignition is determined, and the pre-ignition on startup is prevented by setting the effective compression ratio on the startup according to the determination. However, Japanese Patent Application Laid-open No. 2009-114973 describes only the prevention of the pre-ignition that occurs on the startup (prevention of the pre-ignition refers to prevention of such an operation state that possibly causes the pre-ignition), and does not consider pre-ignition which occurs "after the startup". Moreover, Japanese Patent Application Laid-open No. 2009-114973 does not consider a method of avoiding pre-ignition after the preventive operation of the pre-ignition (avoidance of pre-ignition refers to a change of an operation state to prevent pre-ignition from occurring any more when pre-ignition actually occurs). In addition, though it is assumed that the likelihood of the occurrence of the pre-ignition depends on the intake air temperature, the coolant temperature, and the octane number of the fuel, which are considered independently, the likelihood of the occurrence of the pre-ignition is not considered under a combined condition thereof. There are a plurality of conditions which cause the pre-ignition more frequently, and it is necessary to consider the respective conditions, thereby producing an index of the likelihood of the pre-ignition.

The method described in Japanese Patent Application Laid-open No. 2009-114973 describes that the likelihood of the pre-ignition is determined according to the octane number. When a fuel having a high octane number is used, at whatever high intake air temperature and whatever high water temperature the startup may be conducted (hot start at 50° C. of the intake air temperature and 110° C. of the water temperature in a desert, for example), control of reducing the effective compression ratio is not provided. However, even if a fuel having a high octane number (high octane fuel of 95 [RON], for example) is used, it is experimentally known that pre-ignition may occur at high intake air temperature and high water temperature.

SUMMARY OF THE INVENTION

In order to solve the above-mentioned problems, the present invention has been made, and it is therefore an object of the present invention to provide a pre-ignition estimation/control device for an internal combustion engine which calculates a pre-ignition occurrence index indicating a likelihood of pre-ignition from an intake air temperature, a coolant temperature, and an octane number of a fuel, and controls an intake-cam variable phasing system based on the pre-ignition occurrence index so as to restrict a phase change (change in phase advance) of an intake cam across an entire operation state, to thereby prevent the pre-ignition.

The present invention provides a pre-ignition estimation/control device for an internal combustion engine, including: an intake air temperature sensor for detecting a temperature of intake air to be introduced into a combustion chamber; a water temperature sensor for detecting a coolant temperature of the internal combustion engine; a fuel filling sensor for detecting a flow of a fuel in a fuel filler opening; knock detection means for detecting a change of the internal combustion engine caused by a knock and pre-ignition; an intake-cam variable phasing system for changing opening/closing timings of an intake valve by changing a phase of an intake cam; octane number estimation means for estimating an octane number of the fuel based on detection signals received from the intake air temperature sensor, the water temperature sensor, the fuel filling sensor, and the knock detection means; a pre-ignition-occurrence-index calculation module for calculating a total pre-ignition occurrence index based on the detection signals received from the intake air temperature sensor and the water temperature sensor, and the octane number estimated by the octane number estimation means; a pre-ignition-occurrence-index correction module for correcting, when the pre-ignition is detected, the total pre-ignition occurrence index so as to cause the pre-ignition more likely to occur; an effective-compression-ratio-boundary calculation module for calculating a boundary of an effective compression ratio based on the total pre-ignition occurrence index obtained by the pre-ignition-occurrence-index correction module; an intake-cam-phase-advance calculation module for calculating a phase advance of the intake cam based on an operation condition and the boundary of the effective compression ratio calculated by the effective-compression-ratio-boundary calculation module; and an intake-cam-phase control module for controlling the intake-cam variable phasing system based on the phase advance of the intake cam output from the intake-cam-phase-advance calculation module, to thereby restrict a change in the phase advance of the intake cam.

According to the pre-ignition estimation/control device for an internal combustion engine of the present invention, the intake-cam variable phasing system is controlled based on the pre-ignition occurrence index so as to restrict the phase change (change in phase advance) of the intake cam across the entire operation state and the effective compression ratio is indirectly restricted, to thereby prevent the pre-ignition.

BRIEF DESCRIPTION OF THE DRAWINGS

In the accompanying drawings:

FIG. 7 illustrates an intake air temperature-pre-ignition occurrence index table;

FIG. 8 illustrates a water temperature-pre-ignition occurrence index table;

FIG. 9 illustrates an octane number-pre-ignition occurrence index table;

FIG. 10 illustrates a pre-ignition occurrence index-effective compression ratio boundary map;

FIG. 13 illustrates a phase advance map of the intake cam;

DETAILED DESCRIPTION OF THE PREFERRED EMBODIMENT

Figure 1:
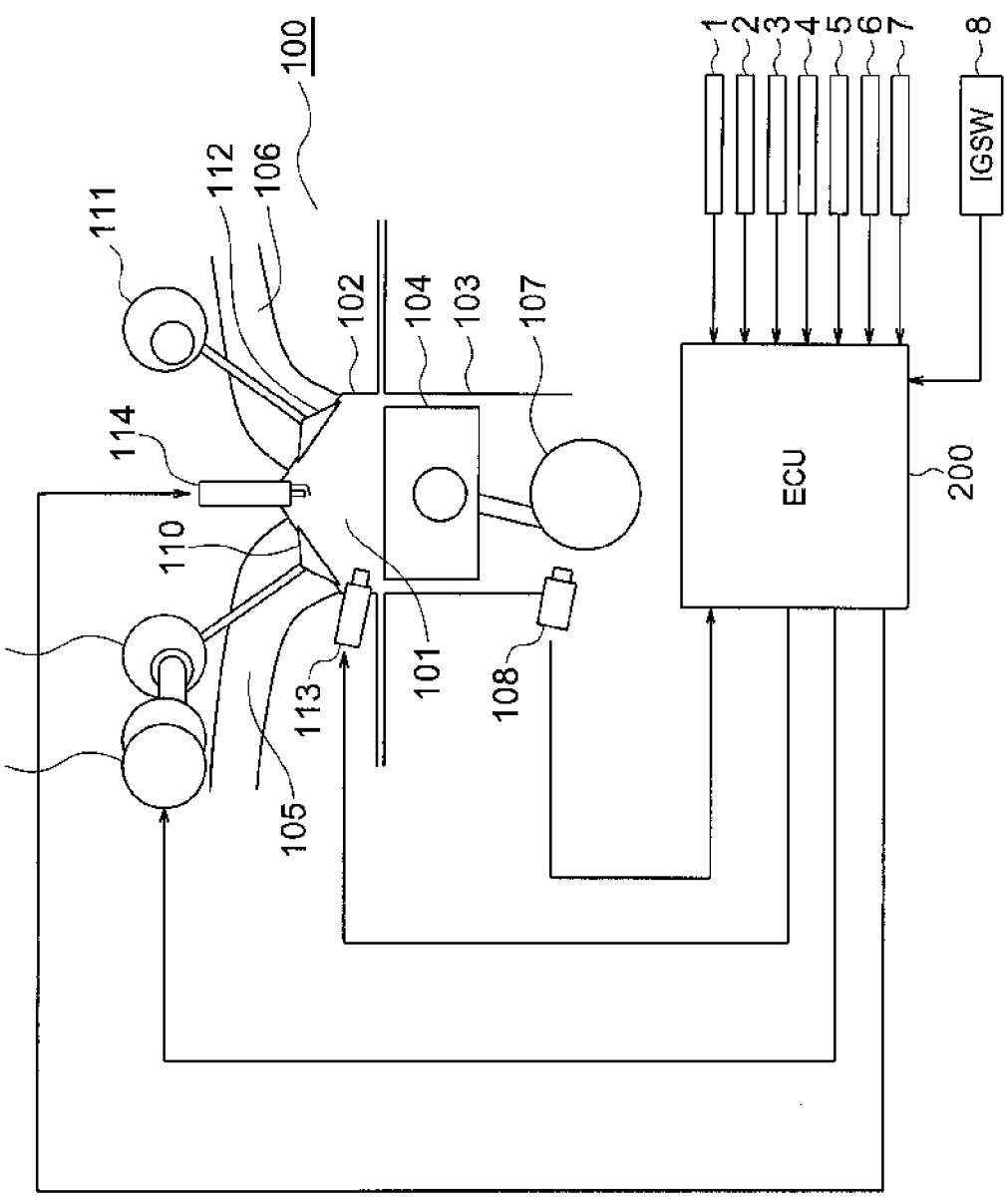
FIG. 1 is a diagram illustrating a schematic configuration of an internal combustion engine according to a first embodiment of the present invention.

Referring to the drawings, a description is now given of a preferred embodiment of a pre-ignition estimation/control device for an internal combustion engine according to the present invention.

First Embodiment

Referring to FIGS. 1 to 14, a description is given of the pre-ignition estimation/control device for an internal combustion engine according to a first embodiment of the present invention. FIG. 1 is a diagram illustrating a schematic configuration of the internal combustion engine according to the first embodiment of the present invention. It should be noted that like and corresponding components are denoted by like numerals throughout the drawings in the following section.

In FIG. 1, a combustion chamber 101 of an internal combustion engine 100 is constructed by a cylinder head 102, a cylinder block 103, and a piston 104.

Further, an intake port 105 and an exhaust port 106 are connected to the combustion chamber 101, and the intake port 105 and the exhaust port 106 are formed on the cylinder head 102.

A crank shaft 107 is connected to the piston 104, and the crank shaft 107 is rotated by a vertical motion of the piston 104. A crank plate (not shown) is attached to the crank shaft 107. The crank plate includes protrusions, and a crank angle sensor 108 detects a rotation speed and a crank angle position of the crank shaft 107 by detecting the protrusions.

An intake valve 110 operated by an intake cam 109 is provided on the combustion chamber 101 side of the intake port 105, and an exhaust valve 112 operated by an exhaust cam 111 is provided on the combustion chamber 101 side of the exhaust port 106. A fuel injection valve 113 is provided below the intake port 105 on the cylinder head 102, and an ignition plug 114 is provided at the top center of the combustion chamber 101.

An intake-cam variable phasing system 10 is connected to the intake cam 109, and changes the opening/closing timings of the intake valve 110 by changing the phase of the intake cam 109. As a result, the effective compression ratio can be restricted.

A brief description is now given of a combustion cycle. First, the air introduced into the combustion chamber 101 via the intake valve 110 from the intake port 105, and the fuel injected into the combustion chamber 101 from the fuel injection valve 113 form a mixture in an intake stroke. Then, the mixture is compressed by the piston 104 in a compression stroke. The mixture is then ignited by the ignition plug 114 near the top dead center (TDC). The ignited mixture pushes down the piston 104, thereby rotating the crank shaft 107 in an expansion stroke. The mixture in the combustion chamber 101 is exhausted via the exhaust valve 112 passing through the exhaust port 106 in an exhaust stroke after the expansion. This is the combustion cycle.

An electronic control unit (ECU) 200 receives a detection signal from the crank angle sensor 108 as well as detection signals from an intake air temperature sensor 1 for detecting the temperature of the intake air to be introduced into the combustion chamber 101, a water temperature sensor 2 for detecting a coolant temperature of the internal combustion engine 100, a fuel filling sensor 3 for detecting a flow of the fuel through a fuel filler opening (not shown) a knock sensor (knock detection means) 4 for detecting a vibration of the internal combustion engine 100, a phase angle sensor 5 for detecting the phase of the intake cam 109, an air mass sensor 6 for detecting the mass of the air introduced into the combustion chamber 101, a throttle position sensor 7 for detecting the throttle opening, and the like, and calculates the phase advance of the intake cam 109, and the rotation speed, the ignition timing, a quantity of the fuel to be injected, and the like of the internal combustion engine 100. It should be noted that the electronic control unit 200 starts the various types of control when the electronic control unit 200 receives an ON signal from an IGSW 8.

Figure 2:
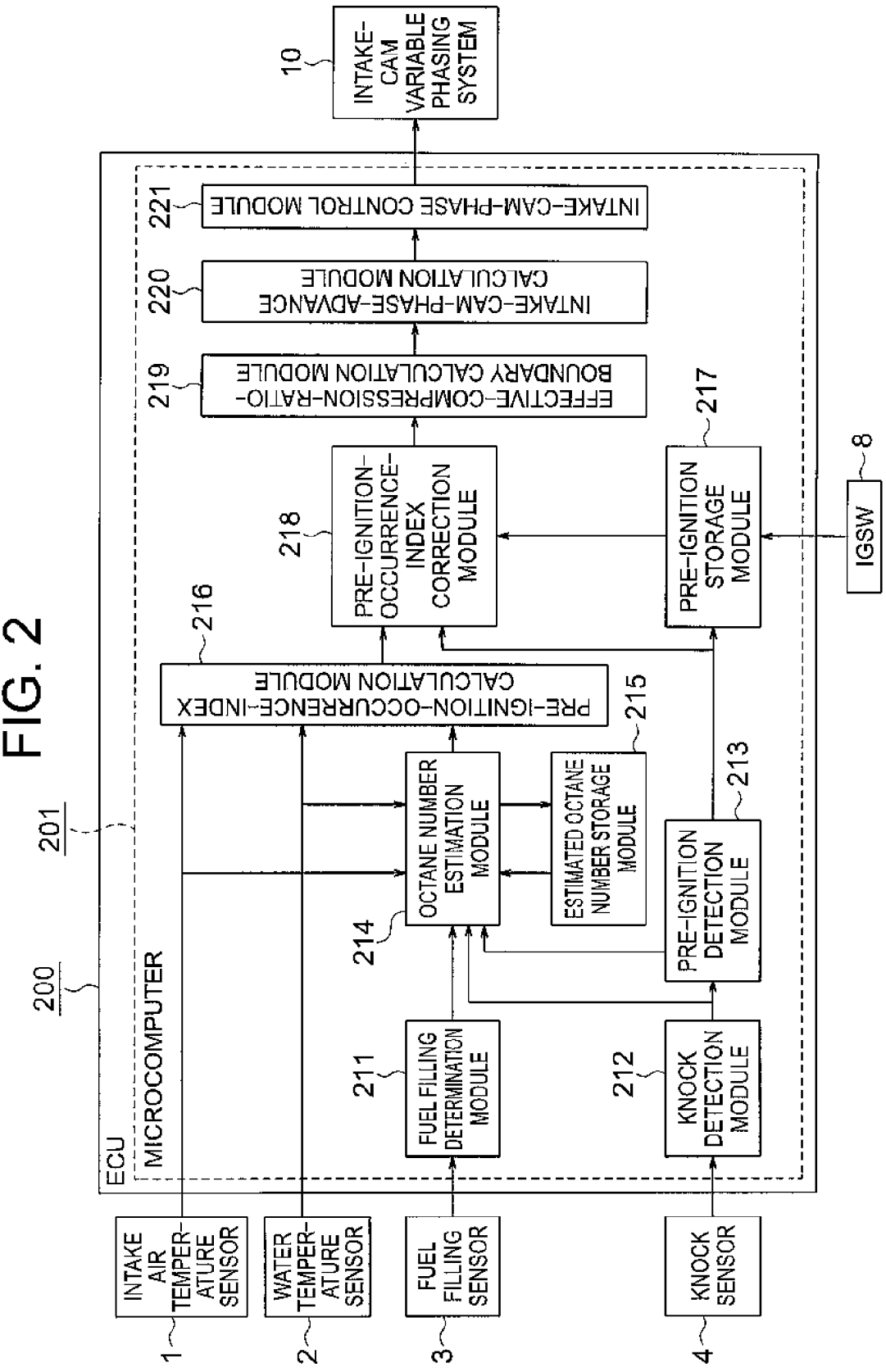
FIG. 2 is a block diagram illustrating a configuration of a pre-ignition estimation/control device for an internal combustion engine according to the first embodiment of the present invention.

FIG. 2 is a block diagram illustrating the configuration of a pre-ignition estimation/control device for an internal combustion engine according to the first embodiment of the present invention.

In FIG. 2, the electronic control unit (ECU) 200 includes various I/F circuits (not shown), and a microcomputer 201.

Moreover, the microcomputer 201 includes A/D converters (not shown) for converting an analog signal such as the detection signals received from the various sensors into a digital signal, a CPU (not shown) for executing various control programs such as a pre-ignition estimation/control program, a ROM (not shown) for storing the various control programs and control constants, various tables, and the like, and a RAM (not shown) for storing variables and the like when the various control programs are executed.

Further, the microcomputer 201 includes a fuel filling determination module 211 for determining whether the fuel has just been filled based on the detection signal received from the fuel filling sensor 3, a knock detection module 212 for detecting a knock based on the detection signal received from the knock sensor 4, a pre-ignition detection module 213 for detecting pre-ignition based on the detection signal received from the knock sensor 4, an octane number estimation module 214 for estimating an octane number of the fuel based on the detection signals and information from the intake air temperature sensor 1, the water temperature sensor 2, the fuel filling determination module 211, the knock detection module 212, and the pre-ignition detection module 213, an estimated octane number storage module 215 for storing the estimated octane number, a pre-ignition-occurrence-index calculation module 216 for calculating a pre-ignition occurrence index based on the detection signals and the estimated octane number from the intake air temperature sensor 1, the water temperature sensor 2, and the octane number estimation module 214, a pre-ignition storage module 217 for storing events of the pre-ignition based on information from the pre-ignition detection module 213, a pre-ignition-occurrence-index correction module 218 for correcting the pre-ignition occurrence index so as to cause pre-ignition likely to occur based on information from the pre-ignition detection module 213, the pre-ignition-occurrence-index calculation module 216, and the pre-ignition storage module 217, an effective-compression-ratio-boundary calculation module 219 for calculating an effective compression ratio boundary based on the pre-ignition occurrence index from the pre-ignition-occurrence-index correction module 218, an intake-cam-phase-advance calculation module 220 for calculating a phase advance of the intake cam 109 based on the effective compression ratio boundary from the effective-compression-ratio-boundary calculation module 219, and an intake-cam-phase control module 221 for controlling the intake-cam variable phasing system 10 based on the intake cam phase advance from the intake-cam-phase-advance calculation module 220.

Though the knock detection module 212 and the pre-ignition detection module 213 are configured as independent modules for the sake of understanding, the knock detection module 212 and the pre-ignition detection module 213 may be integrated into a knock/pre-ignition detection module, which may detect occurrence of the pre-ignition if a vibration level of the detection signal received from the knock sensor 4 exceeds a pre-ignition determination threshold and may detect occurrence of the knock if the vibration level of the detection signal received from the knock sensor 4 exceeds a knock determination threshold.

The fuel filling determination module 211 to the intake-cam-phase control module 221 in the microcomputer 201 except for the estimated octane number storage module 215 and the pre-ignition storage module 217 are software modules constituting the pre-ignition estimation/control program. The estimated octane number storage module 215 is a backup memory for retaining the estimated octane number even when the power supply to the ECU 200 is turned off, and the pre-ignition storage module 217 is a backup memory for retaining the events of the pre-ignition even when the power supply to the ECU 200 is turned off.

Figures 14, 15:
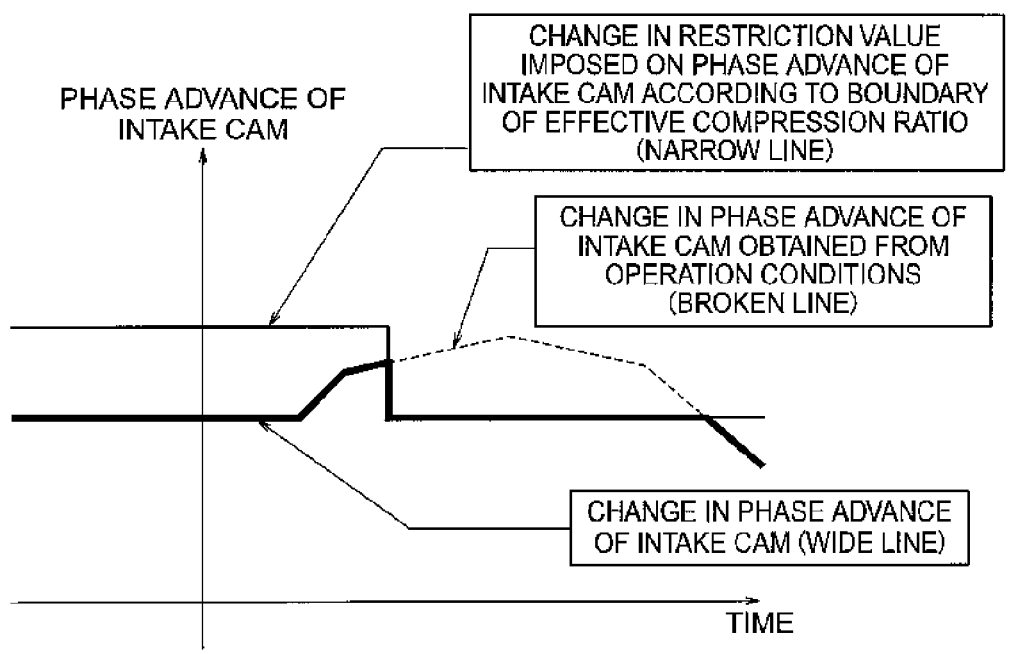
FIG. 14 illustrates an effective compression ratio boundary-intake cam phase advance restriction value map.
FIG. 15 is a diagram illustrating a change in phase advance of the intake cam caused by the pre-ignition estimation/control device for an internal combustion engine according to the first embodiment of the present invention.

An intake air temperature-pre-ignition occurrence index table illustrated in FIG. 7, a water temperature-pre-ignition occurrence index table illustrated in FIG. 8, an octane number-pre-ignition occurrence index table illustrated in FIG. 9, a pre-ignition occurrence index-effective compression ratio boundary map illustrated in FIG. 10, a phase advance map of the intake cam illustrated in FIG. 13, and an effective compression ratio boundary-intake cam phase advance restriction value map illustrated in FIG. 14 are stored in advance in the ROM inside the microcomputer 201. Optimum values obtained by engine adaptability tests are set to each of the tables and maps.

Referring to the drawings, a description is now given of an operation of the pre-ignition estimation/control device for an internal combustion engine according to the first embodiment.

A brief description is first given of a method of estimating the octane number of a fuel. In general, as the octane number decreases, the knock is more likely to occur. Therefore, as a possible method of estimating the octane number, there is a method in which, if the number of events of the knocks within a predetermined period equal to or more than a predetermined number, the octane number is estimated to be low.

Figure 3:
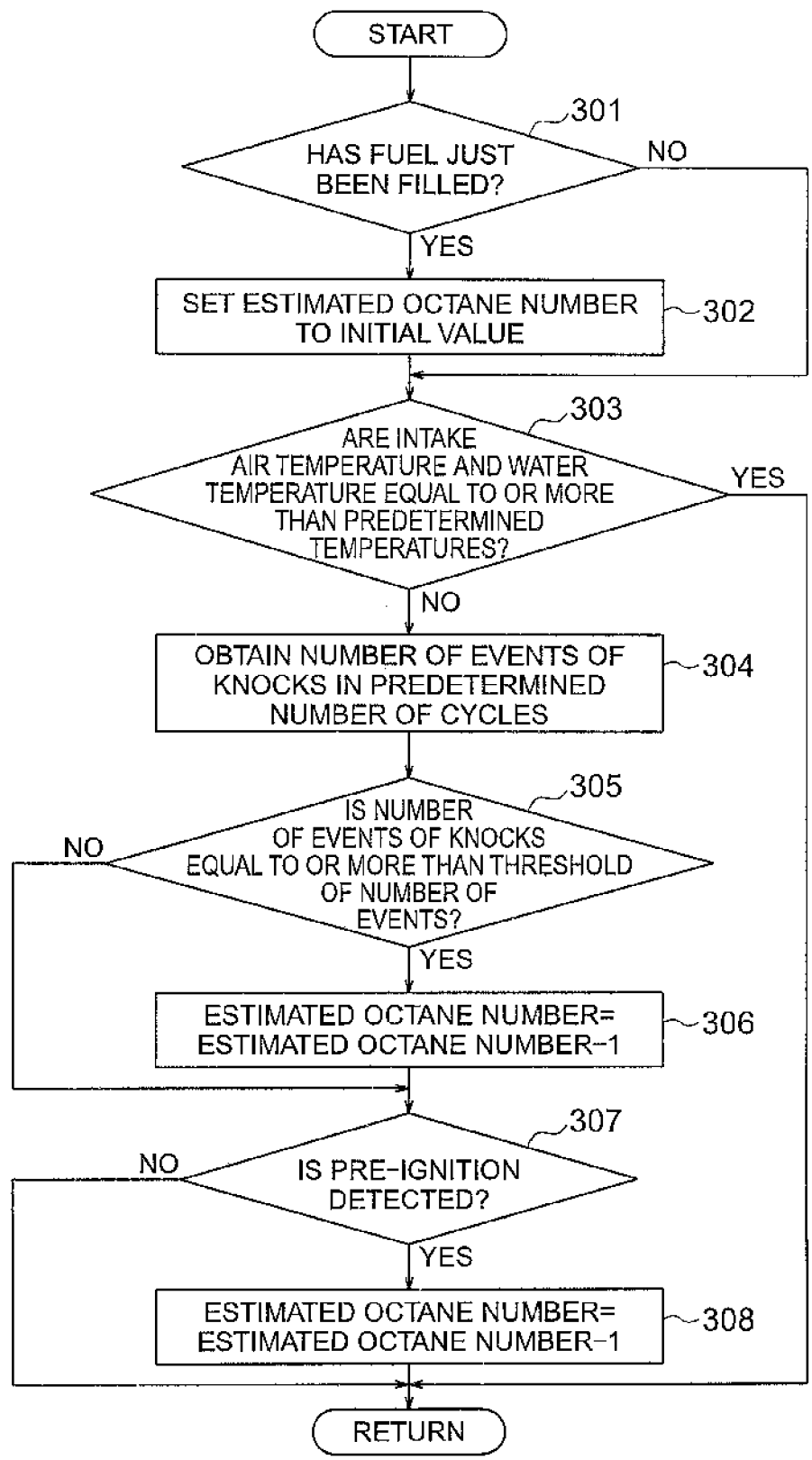
FIG. 3 is a flowchart illustrating an octane number estimation operation by the pre-ignition estimation/control device for an internal combustion engine according to the first embodiment of the present invention.

FIG. 3 is a flowchart illustrating an octane number estimation operation by the pre-ignition estimation/control device for an internal combustion engine according to the first embodiment of the present invention.

The flowchart illustrated in FIG. 3 includes processing of estimating the octane number according to the occurrence frequency of the knock and the like. The octane number estimation processing is carried out at a timing in synchronism with the engine rotation (for example, interrupt handling for every 180 degCA, where degCA denotes the crank angle).

In Step 301, the fuel filling determination module 211 determines whether the detection signal is input from the fuel filling sensor 3 and the fuel has thus just been filled. If the fuel filling determination module 211 determines that the fuel has just been filled, the fuel filling determination module 211 transmits information indicating that "fuel has just been filled" to the octane number estimation module 214, and proceeds to next Step 302. If the fuel filling determination module 211 does not determine that the fuel has just been filled, the fuel filling determination module 211 proceeds to Step 303.

Figure 4:
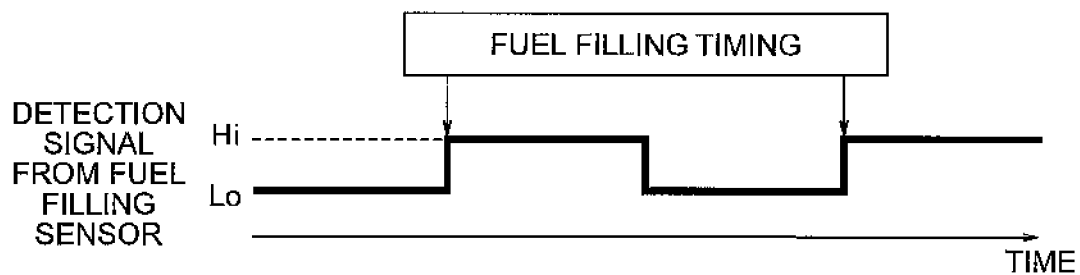
FIG. 4 is a timing chart illustrating a detection signal received from a fuel filling sensor of the pre-ignition estimation/control device for an internal combustion engine according to the first embodiment of the present invention.

FIG. 4 is a timing chart illustrating a detection signal received from a fuel filling sensor of the pre-ignition estimation/control device for an internal combustion engine according to the first embodiment of the present invention.

In FIG. 4, the horizontal axis and the vertical axis respectively represent time and the level of the detection signal. The fuel filling sensor 3 is provided in a fuel filler opening (not shown) and the detection signal is inverted when the fuel flowing through the fuel filler opening is detected. The fuel filling sensor 3 detects the flow of the fuel into the fuel filler opening at the fuel filling timings indicated by the arrows, and switches the detection signal from Lo to Hi, for example. The fuel filling sensor 3 may switch the detection signal from Hi to Lo. The fuel filling determination module 211 determines whether the fuel has just been filled by detecting the timing of the switching in the level of the detection signal received from the fuel filling sensor 3.

In Step 302, the octane number estimation module 214 then sets the estimated octane number to an initial value when the information indicating that "fuel has just been filled" is transmitted from the fuel filling determination module 211, and stores the initial value in the estimated octane number storage module 215.

This initial value is set to a value which does not have influence on the pre-ignition occurrence index. The initial value is set to an octane number (such as 90) causing the pre-ignition occurrence index to be zero, or an octane number obtained when an engine adaptability test is carried out (value corresponding to a regular gasoline if the regular gasoline is specified for the engine), for example. This initial value is stored in the octane number estimation module 214 in advance.

The processing by the octane number estimation module 214 of setting the estimated octane number to the initial value if the fuel filling determination module 211 determines that the fuel has just been filled prevents the estimated octane number before the fuel filling from being used. The pre-ignition occurrence index can then be calculated while the influence of the octane number before the fuel filling is eliminated, thereby preventing a wrong determination due to the influence of the octane number immediately before the fuel filling.

In Step 303, the octane number estimation module 214 then determines whether the intake air temperature and the water temperature are equal to or more than respective predetermined temperatures. If the intake air temperature and the water temperature are equal to or more than the respective predetermined temperatures, the octane number estimation module 214 transmits the estimated octane number stored in the estimated octane number storage module 215 to the pre-ignition-occurrence-index calculation module 216, and finishes this processing. If the intake air temperature or the water temperature is not equal to or more than the corresponding predetermined temperature, the octane number estimation module 214 proceeds to next Step 304.

If the detection signals received from the intake air temperature sensor 1 and the water temperature sensor 2 are input to the octane number estimation module 214, and if the intake air temperature is equal to or more than the intake air temperature threshold and the water temperature is equal to or more than the water temperature threshold, the octane number estimation module 214 does not carry out the update of the estimated octane number by the detection of a knock and pre-ignition. For example, if the intake air temperature is equal to or more than 50° C., which is the intake air temperature threshold, and the water temperature is equal to or more than 110° C., which is the water temperature threshold, the octane number estimation module 214 does not update the estimated octane number. This is because factors causing the pre-ignition (including the knock) include environmental conditions as well as a low octane number, and this processing prevents the estimated octane number from being set too low.

In Step 304, the knock detection module 212 then receives the detection signal from the knock sensor 4, and, if the knock detection module 212 detects a knock, the knock detection module 212 transmits information indicating "knock detected" to the octane number estimation module 214. Moreover, the pre-ignition detection module 213 receives the detection signal from the knock sensor 4 and, if the pre-ignition detection module 213 detects pre-ignition, the pre-ignition detection module 213 transmits information indicating "pre-ignition detected" to the octane number estimation module 214. The octane number estimation module 214 obtains the number of events of knocks within a predetermined number of cycles by counting the number of receptions of the information indicating "knock detected" transmitted from the knock detection module 212.

Figure 5:
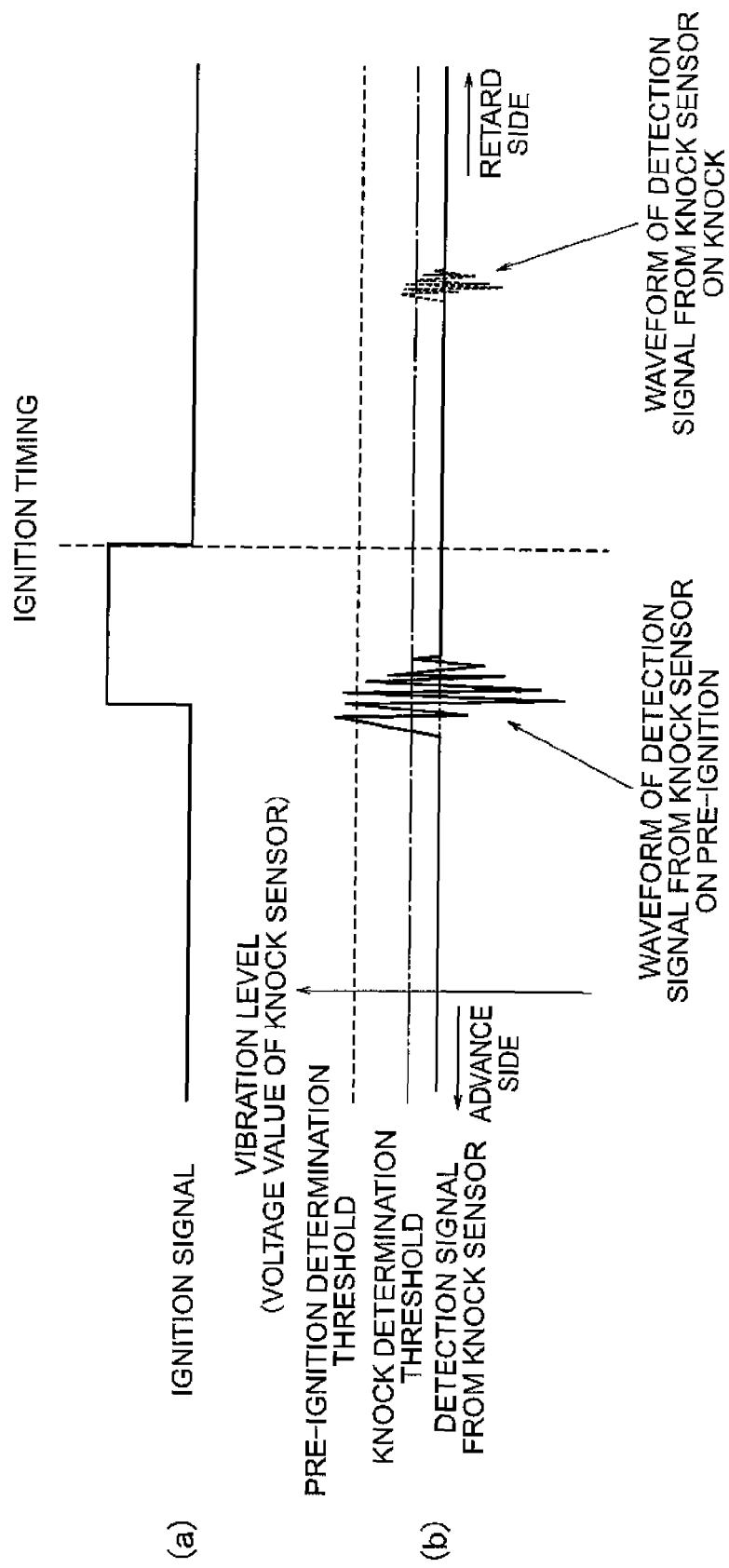
FIG. 5 is a timing chart illustrating a detection signal received from a knock sensor of the pre-ignition estimation/control device for an internal combustion engine and an ignition signal according to the first embodiment of the present invention.

FIG. 5 is a timing chart illustrating the detection signal received from the knock sensor of the pre-ignition estimation/control device for an internal combustion engine and the ignition signal according to the first embodiment of the present invention.

The horizontal axis represents time (angle axis) in FIG. 5, and the left side of the ignition timing illustrated in FIG. 5 is the advance side and the right side is the retard side. The vertical axis represents respective levels of the ignition signal (a) and the detection signal (b) received from the knock sensor 4. The knock sensor 4 detects vibrations of the internal combustion engine 100 that have occurred by a knock, converts the vibrations into a voltage, and outputs the voltage as the detection signal. The waveform of the detection signal received from the knock sensor 4 thus represents the vibration level, and a larger vibration level corresponds to a larger vibration.

A waveform of the detection signal received from the knock sensor 4, which is illustrated on the advance side with respect to the ignition timing in FIG. 5, is a waveform during pre-ignition, and a waveform of the detection signal received from the knock sensor 4, which is illustrated on the retard side with respect to the ignition timing, is a waveform during a knock. The knock detection module 212 usually sets the knock determination threshold (long dashed short dashed line), and detects occurrence of the knock if the vibration level of the detection signal received from the knock sensor 4 exceeds the knock determination threshold. Moreover, the pre-ignition detection module 213 usually sets the pre-ignition determination threshold (broken line) higher in level than the knock determination threshold, and detects occurrence of the pre-ignition if the vibration level of the detection signal received from the knock sensor 4 exceeds the pre-ignition determination threshold. This is because of the fact that the vibration level of the pre-ignition is obviously higher than the vibration level of the knock. It is thus possible to distinguish the pre-ignition and the knock from each other according to the vibration level. Note that, the pre-ignition and the knock may be distinguished from each other according to other methods.

In Step 305, the octane number estimation module 214 then determines whether the number of events of the knocks within the predetermined number of cycles is equal to or more than a threshold of the number of events of the knocks. The octane number estimation module 214 determines whether the number of events of the knocks is equal to or more than 20 in 100 cycles, for example. If the number of events of the knocks within the predetermined number of cycles is equal to or more than the threshold of the number of events of the knocks, the octane number estimation module 214 proceeds to next Step 306, and if the number is less than the threshold, the octane number estimation module 214 proceeds to Step 307.

In Step 306, the octane number estimation module 214 then updates the estimated octane number stored in the estimated octane number storage module 215 to be lower. The octane number estimation module 214 carries out a calculation "new estimated octane number=present estimated octane number-1", thereby updating the present estimated octane number to a lower value by one, for example.

In Step 307, the octane number estimation module 214 then determines whether pre-ignition is detected. The octane number estimation module 214 determines presence/absence of the detection of pre-ignition according to whether the information indicating "pre-ignition detected" is transmitted from the pre-ignition detection module 213. The octane number estimation module 214 proceeds to next Step 308 if the octane number estimation module 214 detects pre-ignition, and otherwise the octane number estimation module 214 transmits the estimated octane number stored in the estimated octane number storage module 215 to the pre-ignition-occurrence-index calculation module 216, and finishes this processing.

In Step 308, the octane number estimation module 214 then updates the estimated octane number stored in the estimated octane number storage module 215 to be lower. The octane number estimation module 214 carries out a calculation "new estimated octane number=present estimated octane number-1", thereby updating the present estimated octane number to a lower value by one, for example. Moreover, the octane number estimation module 214 resets the count of events of the knocks if pre-ignition is detected. The octane number estimation module 214 transmits the estimated octane number stored in the estimated octane number storage module 215 to the pre-ignition-occurrence-index calculation module 216, and finishes this processing.

When the pre-ignition detection module 213 detects a pre-ignition, and transmits the information indicating "pre-ignition detected" to the octane number estimation module 214, the pre-ignition detection module 213 also transmits the information indicating "pre-ignition detected" to the pre-ignition storage module 217 and the pre-ignition-occurrence-index correction module 218. When the pre-ignition storage module 217 receives the transmitted information indicating "pre-ignition detected", the pre-ignition storage module 217 stores the information on the pre-ignition occurrence, and when the OFF signal is input from the IGSW 8, the pre-ignition storage module 217 deletes the information on the pre-ignition occurrence. The pre-ignition detection processing is carried out in a cycle of 180 degCA including the startup, for example.

It goes without saying that an in-cylinder pressure sensor or a rotation fluctuation sensor, or the like may be used as the knock detection means for detecting a knock or pre-ignition, thereby updating the estimated octane number. The in-cylinder sensor, similarly to the knock sensor 4, detects the in-cylinder pressure changed by a knock or pre-ignition, converts the in-cylinder pressure into a voltage, and outputs the voltage as the detection signal. Moreover, the rotation fluctuation sensor, similarly to the knock sensor 4, detects the rotation of the internal combustion engine 100 fluctuated by a knock or pre-ignition, converts the rotation speed into a voltage, and outputs the voltage as the detection signal. The knock detection module 212 detects occurrence of the knock when the level of the detection signal fed from the in-cylinder pressure sensor or the rotation fluctuation sensor exceeds the knock determination threshold. Moreover, the pre-ignition detection module 213 detects occurrence of the pre-ignition when the level of the detection signal fed from the in-cylinder pressure sensor or the rotation fluctuation sensor exceeds the pre-ignition determination threshold.

Figure 6:
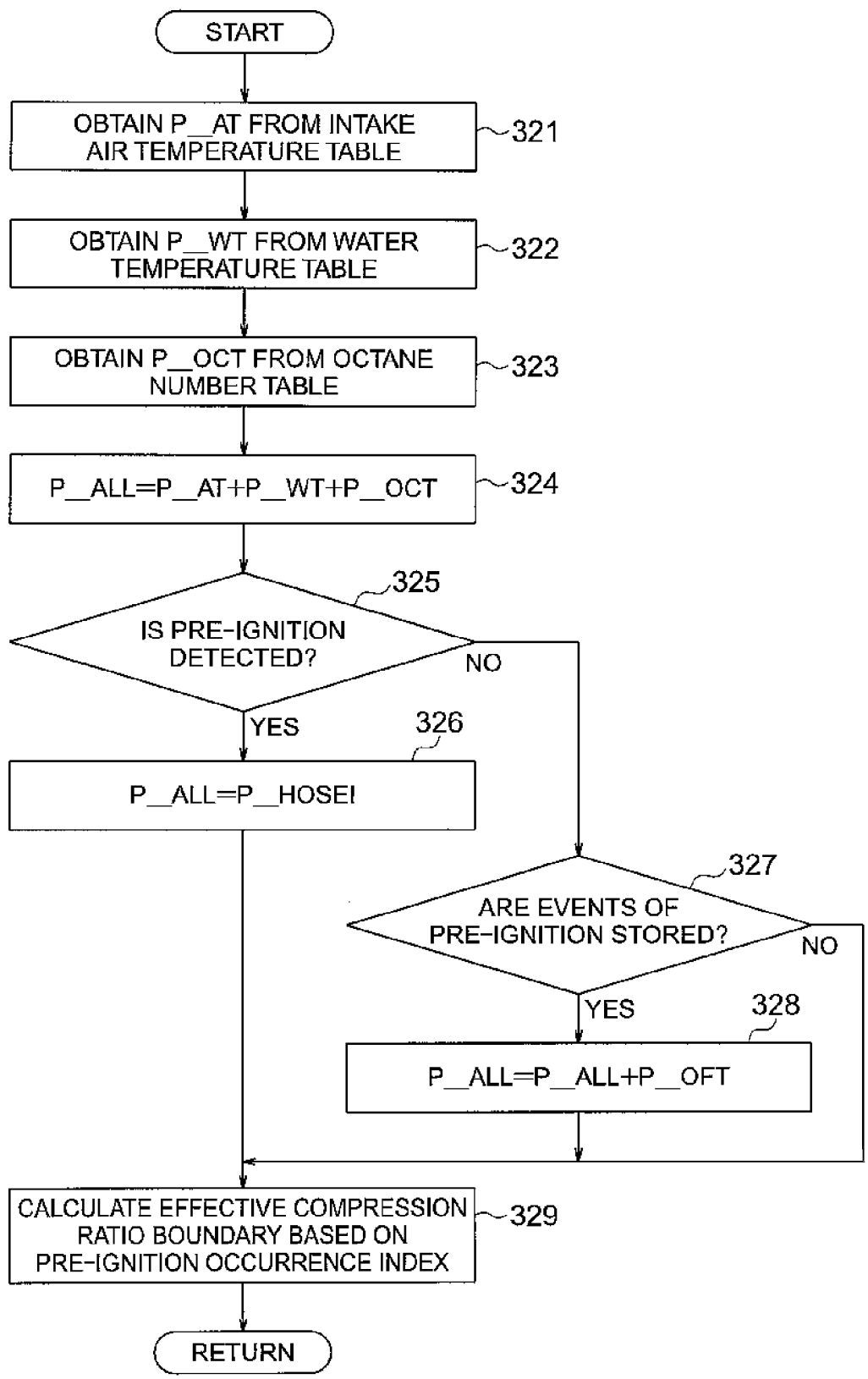
FIG. 6 is a flowchart illustrating a pre-ignition occurrence index calculation operation and an effective compression ratio boundary calculation operation by the pre-ignition estimation/control device for an internal combustion engine according to the first embodiment of the present invention.

FIG. 6 is a flowchart illustrating a pre-ignition occurrence index calculation operation and an effective compression ratio boundary calculation operation by the pre-ignition estimation/control device for an internal combustion engine according to the first embodiment of the present invention.

The flowchart illustrated in FIG. 6 includes the processing of calculating the pre-ignition occurrence index representing the likelihood of the occurrence of the pre-ignition and a boundary of the effective compression ratio. The processing of calculating the pre-ignition occurrence index and the effective compression ratio boundary is processing carried out at a timing in synchronism with the engine rotation (interrupt handling at every 180 degCA, for example).

In Step 321, the pre-ignition-occurrence-index calculation module 216 receives the detection signal from the intake air temperature sensor 1 thereby obtaining the intake air temperature, and obtains a pre-ignition occurrence index P_AT according to the intake air temperature from the intake air temperature-pre-ignition occurrence index table describing a correspondence between the intake air temperature and the pre-ignition occurrence index. The intake air temperature-pre-ignition occurrence index table as illustrated in FIG. 7 is prepared in advance, and the pre-ignition occurrence index P_AT according to the intake air temperature is obtained. If the intake air temperature is 50° C., for example, a pre-ignition occurrence index P_AT of 10 according to the intake air temperature is obtained from this intake air temperature table.

Next, in Step 322, the pre-ignition-occurrence-index calculation module 216 receives the detection signal from the water temperature sensor 2 thereby obtaining the water temperature, and obtains a pre-ignition occurrence index P_WT according to the water temperature from the water temperature-pre-ignition occurrence index table describing a correspondence between the water temperature and the pre-ignition occurrence index. The water temperature-pre-ignition occurrence index table as illustrated in FIG. 8 is prepared in advance, and the pre-ignition occurrence index P_WT according to the water temperature is obtained. If the water temperature is 100° C., for example, a pre-ignition occurrence index P_WT of 10 according to the water temperature is obtained from this water temperature table.

Next, in Step 323, the pre-ignition-occurrence-index calculation module 216 obtains the octane number estimated by the octane number estimation module 214, and obtains a pre-ignition occurrence index P_OCT according to the octane number from the octane number-pre-ignition occurrence index table describing a correspondence between the octane number and the pre-ignition occurrence index. The octane number-pre-ignition occurrence index table as illustrated in FIG. 9 is prepared in advance, and the pre-ignition occurrence index P_OCT according to the octane number is obtained. If the octane number is 95 [Ron], for example, a pre-ignition occurrence index P_OCT of 0 according to the octane number is obtained from this octane number table.

In Step 324, the pre-ignition-occurrence-index calculation module 216 then sums the respective parameters (respective pre-ignition occurrence indices) obtained in the respective steps, thereby calculating a total pre-ignition occurrence index P_ALL. The pre-ignition-occurrence-index calculation module 216 calculates P_ALL=P_AT+P_WT+P_OCT. The total pre-ignition occurrence index P_ALL=10+10+0=20 is obtained, for example.

On this occasion, as the values of the pre-ignition occurrence indices obtained from the intake air temperature and the water temperature, a positive value is set in a temperature range in which pre-ignition is likely to occur, and a negative value is set in a temperature range in which pre-ignition is less likely to occur. Moreover, as the value of the pre-ignition occurrence index obtained from the octane number, a positive value is set for an octane number at which pre-ignition is likely to occur, and a negative value is set for an octane number at which pre-ignition is less likely to occur while a predetermined octane number (such as an octane number of a fuel used for an engine adaptability test) is designated as a reference. This configuration enables to set a proper pre-ignition occurrence index for each of the parameters, and thus to carry out the control only when pre-ignition is more likely to occur. Even when only one parameter indicates that pre-ignition is likely to occur, as long as the other parameters indicate that pre-ignition is less likely to occur, it is not finally necessary to control the intake-cam variable phasing system 10.

In Step 325, the pre-ignition-occurrence-index correction module 218 then determines whether pre-ignition is detected. If pre-ignition is detected, the pre-ignition-occurrence-index correction module 218 proceeds to next Step 326, and if pre-ignition is not detected, the pre-ignition-occurrence-index correction module 218 proceeds to Step 327. The pre-ignition-occurrence-index correction module 218 determines presence/absence of the detection of pre-ignition according to whether the information indicating "pre-ignition detected" is transmitted from the pre-ignition detection module 213.

The pre-ignition-occurrence-index correction module 218 corrects the pre-ignition occurrence index calculated by the pre-ignition-occurrence-index calculation module 216 so as to cause pre-ignition likely to occur only when the pre-ignition is detected. Moreover, if an event of previous pre-ignition is stored in the pre-ignition storage module 217 in a cycle in which pre-ignition is not detected, the pre-ignition-occurrence-index correction module 218 corrects the pre-ignition occurrence index so as to cause pre-ignition likely to occur.

In Step 326, the pre-ignition-occurrence-index correction module 218 then assigns a first pre-ignition occurrence index correction value P_HOSEI to the total pre-ignition occurrence index P_ALL. An index which corresponds to the lower limit of the boundary of the effective compression ratio is set as the pre-ignition occurrence index correction value P_HOSEI. For example, if a pre-ignition occurrence index corresponding to the lower limit of the boundary of the effective compression ratio is 60, P_HOSEI=60 and P_ALL=P_HOSEI=60. This configuration enables to set the boundary of the effective compression ratio to the lower limit when pre-ignition has occurred, and subsequent occurrence of the pre-ignition can be prevented without taking special prevention measures.

In Step 327, the pre-ignition-occurrence-index correction module 218 then determines whether the pre-ignition storage module 217 stores an event of previous pre-ignition. If the pre-ignition storage module 217 stores an event of previous pre-ignition, the pre-ignition-occurrence-index correction module 218 proceeds to next Step 328, and if the pre-ignition storage module 217 does not store an event of previous pre-ignition, the pre-ignition-occurrence-index correction module 218 proceeds to Step 329.

In Step 328, the pre-ignition-occurrence-index correction module 218 then adds, to the total pre-ignition occurrence index P_ALL, a second pre-ignition occurrence index correction value P_OFT which is set in advance so as to cause the pre-ignition occurrence index to be a value indicating that pre-ignition is likely to occur, thereby generating the total pre-ignition occurrence index P_ALL for this time. For example, if the pre-ignition occurrence index correction value P_OFT=10, the total pre-ignition occurrence index P_ALL for this time is represented as P_ALL=P_ALL+P_OFT=20+10=30.

The possibility of the occurrence of the pre-ignition during a travel in which pre-ignition was occurred can be reduced by storing an event of the previous occurrence of the pre-ignition, and correcting the pre-ignition occurrence index according to whether pre-ignition has occurred before.

In Step 329, the effective-compression-ratio-boundary calculation module 219 then calculates a boundary of the effective compression ratio based on the total pre-ignition occurrence index. As illustrated in FIG. 10, a pre-ignition occurrence index-effective compression ratio boundary map describes a correspondence between the pre-ignition occurrence index and the boundary of the effective compression ratio, and in an X-Y coordinate system, the minimum value of the pre-ignition occurrence index (such as −30) and the maximum value of the pre-ignition occurrence index (such as 60) are set on an X axis, while a lower limit of the boundary of the effective compression ratio which is a condition that causes pre-ignition likely to occur (such as compression ratio of 8) and an upper limit of the boundary of the effective compression ratio which is a condition that causes pre-ignition less likely to occur (such as compression ratio of 20) are set on a Y axis. The effective-compression-ratio-boundary calculation module 219 calculates a boundary of the effective compression ratio by linearly interpolating between the upper limit and the lower limit of the boundary of the effective compression ratio on the pre-ignition occurrence index-effective compression ratio boundary map based on the total pre-ignition occurrence index P_ALL.

The effective-compression-ratio-boundary calculation module 219 calculates a boundary of the effective-compression ratio which does not cause pre-ignition according to the present state of the internal combustion engine 100 from the total pre-ignition occurrence index P_ALL transmitted from the pre-ignition-occurrence-index correction module 218. As described above, the pre-ignition is a phenomenon in which the mixture in the combustion chamber 101 reaches high temperature by the compression and is thus auto-ignited, and hence decreasing the effective compression ratio and decreasing the temperature in the combustion chamber 101 by fuel injection conceivable as measures to avoid pre-ignition. This pre-ignition estimation/control device carries out the calculation for decreasing the effective compression ratio, and finally controls the intake-cam variable phasing system 10 to prevent pre-ignition.

Referring to FIG. 10, for example, a pre-ignition occurrence index P_ALL of 60 and a lower limit of the boundary of the effective compression ratio of 8 are set as a condition in which pre-ignition is likely to occur, and a pre-ignition occurrence index P_ALL of −30 and an upper limit of the boundary of the effective compression ratio of 20 are set as a condition in which pre-ignition is less likely to occur.

The total pre-ignition occurrence index P_ALL before the correction in Step 324 is 20, and the effective-compression-ratio-boundary calculation module 219 obtains a compression ratio of 13.3 by linearly interpolating between the compression ratios of 8 and 20 on the pre-ignition occurrence index-effective compression ratio boundary map based on the total pre-ignition occurrence index P_ALL of 20. Moreover, if pre-ignition is detected in Step 326, the total pre-ignition occurrence index P_ALL is 60, and the effective-compression-ratio-boundary calculation module 219 obtains a compression ratio of 8 from the lower limit of the boundary of the effective compression ratio on the pre-ignition occurrence index-effective compression ratio boundary map based on the total pre-ignition occurrence index P_ALL of 60.

Figure 11:
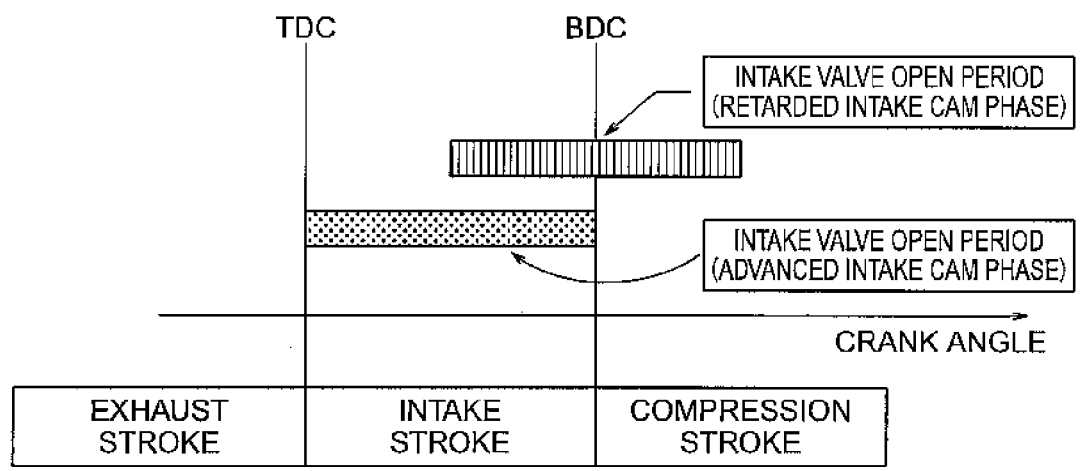
FIG. 11 is a diagram illustrating a relationship between a phase of an intake cam and an open period of an intake valve, which are provided by the pre-ignition estimation/control device for an internal combustion engine according to the first embodiment of the present invention.

A description is now given of a relationship between the phase of the intake cam 109 and the open period of the intake valve 110. FIG. 11 is a diagram illustrating the relationship between the phase of the intake cam and the open period of the intake valve, which are provided by the pre-ignition estimation/control device for an internal combustion engine according to the first embodiment of the present invention.

In FIG. 11, a portion having a dot pattern on a lower level represents the open period of the intake valve for an advanced phase of the intake cam 109, and a portion having a vertical-line pattern on an upper level represents the open period of the intake valve for a retarded phase of the intake cam 109. TDC and BDC respectively denote the top dead center and the bottom dead center. As illustrated in FIG. 11, if the phase of the intake cam 109 is advanced, the open period of the intake valve 110 is in the intake stroke, and the quantity of the intake air in the combustion chamber 101 of the internal combustion engine 100 is high, resulting in a high effective compression ratio. On the other hand, if the phase of the intake cam 109 is retarded, the intake valve 110 is still open in the compression stroke, and blow back occurs, resulting in a decrease in quantity of the intake air in the combustion chamber 101. Thus, the effective compression ratio can be low. This phenomenon can be employed to restrict the phase change of the intake cam 109, thereby indirectly restricting the effective compression ratio. The pre-ignition estimation/control device controls the intake-cam variable phasing system 10, which changes the phase of the intake cam 109 to change the open/close timings of the intake valve 110, so as to restrict the phase change (change in phase advance) of the intake cam 109 across the entire operation state, thereby indirectly restricting the effective compression ratio, and preventing the pre-ignition.

Figure 12:
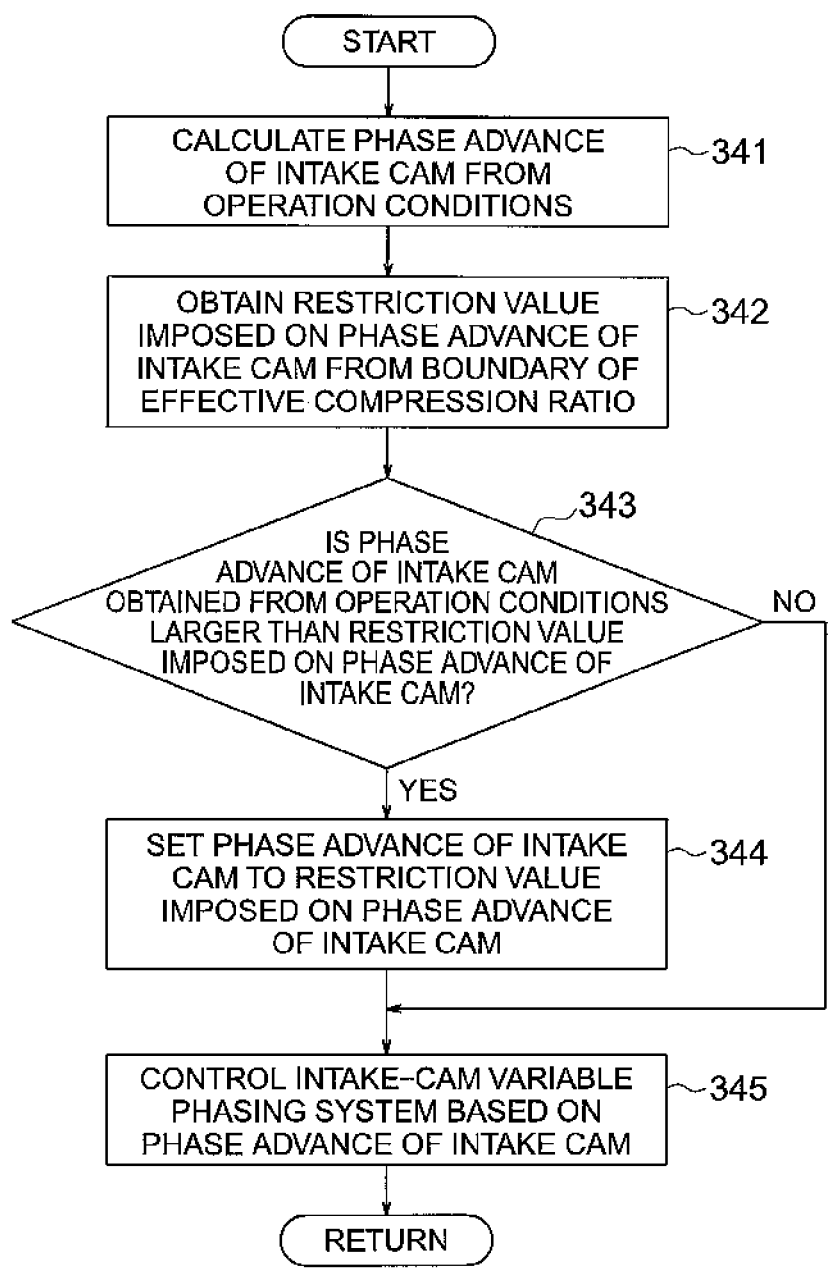
FIG. 12 is a flowchart illustrating an intake cam phase advance calculation operation by the pre-ignition estimation/control device for an internal combustion engine according to the first embodiment of the present invention.

FIG. 12 is a flowchart illustrating an intake cam phase advance calculation operation by the pre-ignition estimation/control device for an internal combustion engine according to the first embodiment of the present invention.

In Step 341, the intake-cam-phase-advance calculation module 220 calculates the phase advance of the intake cam 109 according to the operation condition. In other words, the intake-cam-phase-advance calculation module 220 obtains a rotation speed Ne of the internal combustion engine 100 from the detection signal of the crank angle sensor 108, and a throttle opening from the detection signal of the throttle position sensor 7 respectively. As illustrated in FIG. 13, the intake-cam-phase-advance calculation module 220 calculates the phase advance of the intake cam 109 from the phase advance map for the intake cam describing a correspondence of the phase advance to the rotation speed Ne [r/min] and the throttle opening [%].

In Step 342, the intake-cam-phase-advance calculation module 220 then obtains the restriction value imposed on the phase advance of the intake cam 109 from the boundary of the effective compression ratio. As illustrated in FIG. 14, the effective compression ratio boundary-intake cam phase advance restriction value map describes the correspondence between the boundary of the effective compression ratio and the restriction value imposed on the phase advance of the intake cam 109, and the lower limit of the boundary of the effective compression ratio (such as compression ratio of 8) and the upper limit of the boundary of the effective compression ratio (such as compression ratio of 20) are set on an X axis, and a lower limit of the restriction value imposed on the phase advance of the intake cam 109 (such as 0 degCA) and an upper limit of the restriction value imposed on the phase advance of the intake cam 109 (such as 50 degCA) are set on a Y axis in an X-Y coordinate system. For example, when the boundary of the effective compression ratio is restricted to a compression ratio of 13.3, the intake-cam-phase-advance calculation module 220 obtains a restriction value of 22.1 degCA imposed on the phase advance of the intake cam 109 by linearly interpolating between the upper limit and the lower limit of the restriction value imposed on the phase advance on the effective compression ratio boundary-intake cam phase advance restriction value map based on the boundary (compression ratio of 13.3) of the effective compression ratio calculated by the effective-compression-ratio-boundary calculation module 219.

In Step 343, the intake-cam-phase-advance calculation module 220 then compares the phase advance of the intake cam 109 obtained from the operation condition and the restriction value imposed on the phase advance of the intake cam 109. If the phase advance of the intake cam 109 obtained from the operation condition is larger than the restriction value, the intake-cam-phase-advance calculation module 220 proceeds to next Step 344, and if the phase advance of the intake cam 109 obtained from the operation condition is equal to or less than the restriction value, the intake-cam-phase-advance calculation module 220 proceeds to Step 345.

In Step 344, the intake-cam-phase-advance calculation module 220 then sets the phase advance of the intake cam 109 to the restriction value imposed on the phase advance of the intake cam 109.

In Step 345, the intake-cam-phase control module 221 then outputs a control signal to the intake-cam variable phasing system 10, which changes the opening/closing timings of the intake valve 110 by changing the phase of the intake cam 109 based on the phase advance of the intake cam 109 calculated by the intake-cam-phase-advance calculation module 220, to thereby control the intake-cam variable phasing system 10 to restrict the phase change (change in phase advance) of the intake cam 109 as illustrated in FIG. 15. The restriction of the phase change (change in phase advance) of the intake cam 109 indirectly restricts the effective compression ratio in this way, and the pre-ignition estimation/control device for an internal combustion engine according to the first embodiment can prevent the pre-ignition from occurring.

FIG. 15 is a diagram illustrating a change in phase advance of the intake cam caused by the pre-ignition estimation/control device for an internal combustion engine according to the first embodiment of the present invention.

In FIG. 15, the horizontal axis and the vertical axis respectively represent time and the phase advance (degCA) of the intake cam 109. FIG. 15 illustrates the change in phase advance of the intake cam 109 obtained from the operation conditions (broken line), the change in restriction value imposed on the phase advance of the intake cam 109 according to the boundary of the effective compression ratio (narrow line), and the change in phase advance of the intake cam 109 determined by combination of the phase advance of the intake cam 109 obtained from the operation conditions and the restriction value imposed on the phase advance (wide line).

The pre-ignition estimation/control device for an internal combustion engine according to the first embodiment can prevent the pre-ignition from occurring without inducing an unnecessary decrease in torque by controlling the intake-cam variable phasing system 10 according to the likelihood of the occurrence of the pre-ignition.

Though the pre-ignition estimation/control device for an internal combustion engine according to the first embodiment is applied to the in-cylinder-injection internal combustion engine, the estimation of the pre-ignition occurrence index itself is effective also for other internal combustion engines such as a port-injection internal combustion engine.

What is claimed is:

1. A pre-ignition estimation/control device for an internal combustion engine, comprising:
    an intake air temperature sensor for detecting a temperature of intake air to be introduced into a combustion chamber;
    a water temperature sensor for detecting a coolant temperature of the internal combustion engine;
    a fuel filling sensor for detecting a flow of a fuel in a fuel filler opening;
    knock detection means for detecting a change of the internal combustion engine caused by a knock and pre-ignition;
    an intake-cam variable phasing system for changing opening/closing timings of an intake valve by changing a phase of an intake cam;
    octane number estimation means for estimating an octane number of the fuel based on detection signals received from the intake air temperature sensor, the water temperature sensor, the fuel filling sensor, and the knock detection means;
    a pre-ignition-occurrence-index calculation module for calculating a total pre-ignition occurrence index based on the detection signals received from the intake air temperature sensor and the water temperature sensor, and the octane number estimated by the octane number estimation means;
    a pre-ignition-occurrence-index correction module for correcting, when the pre-ignition is detected, the total pre-ignition occurrence index so as to cause the pre-ignition more likely to occur;
    an effective-compression-ratio-boundary calculation module for calculating a boundary of an effective compression ratio based on the total pre-ignition occurrence index obtained by the pre-ignition-occurrence-index correction module;
    an intake-cam-phase-advance calculation module for calculating a phase advance of the intake cam based on an operation condition and the boundary of the effective compression ratio calculated by the effective-compression-ratio-boundary calculation module; and
    an intake-cam-phase control module for controlling the intake-cam variable phasing system based on the phase advance of the intake cam output from the intake-cam-phase-advance calculation module, to thereby restrict a change in the phase advance of the intake cam.

2. A pre-ignition estimation/control device for an internal combustion engine according to claim 1, wherein the octane number estimation means comprises:
    a fuel filling determination module for determining whether the fuel has just been filled based on the detection signal received from the fuel filling sensor;
    a knock detection module for detecting the knock based on the detection signal received from the knock detection means;
    a pre-ignition detection module for detecting the pre-ignition based on the detection signal received from the knock detection means; and
    an octane number estimation module for:
        setting an estimated octane number of the fuel to an initial value when the fuel filling determination module determines that the fuel has just been filled;
        obtaining a number of events of the knocks detected by the knock detection module, and updating the estimated octane number to be lower if the number of events of the knocks in a predetermined number of cycles is equal to or more than a threshold of the number of events;
        updating the estimated octane number to be lower, and resetting the number of events of the knocks when the pre-ignition detection module detects the pre-ignition; and
        skipping the update of the estimated octane number by knock detection and pre-ignition detection if the temperature of the intake air detected by the intake air temperature sensor is equal to or more than an intake air temperature threshold and the coolant temperature detected by the water temperature sensor is equal to or more than a water temperature threshold.

3. A pre-ignition estimation/control device for an internal combustion engine according to claim 2, wherein the pre-ignition-occurrence-index correction module is configured to:
    set the total pre-ignition occurrence index to a first corrected pre-ignition occurrence index corresponding to a lower limit of the boundary of the effective compression ratio if the pre-ignition detection module detects the pre-ignition; and
    add a second corrected pre-ignition occurrence index to the total pre-ignition occurrence index so as to cause the pre-ignition more likely to occur if the pre-ignition detection module does not detect the pre-ignition and has detected the pre-ignition before.

4. A pre-ignition estimation/control device for an internal combustion engine according to claim 1, wherein the pre-ignition-occurrence-index calculation module is configured to:
    obtain a first pre-ignition occurrence index from an intake air temperature-pre-ignition occurrence index table based on the temperature of the intake air detected by the intake air temperature sensor;
    obtain a second pre-ignition occurrence index from a water temperature-pre-ignition occurrence index table based on the coolant temperature detected by the water temperature sensor;
    obtain a third pre-ignition occurrence index from an octane number-pre-ignition occurrence index table based on the octane number estimated by the octane number estimation means; and calculate the total pre-ignition occurrence index by summing the first pre-ignition occurrence index, the second pre-ignition occurrence index, and the third pre-ignition occurrence index.

5. A pre-ignition estimation/control device for an internal combustion engine according to claim 4, wherein the intake air temperature-pre-ignition occurrence index table has set thereto:
   a positive pre-ignition occurrence index in a temperature range in which the pre-ignition is likely to occur; and
   a negative pre-ignition occurrence index in a temperature range in which the pre-ignition is less likely to occur.

6. A pre-ignition estimation/control device for an internal combustion engine according to claim 4, wherein the water temperature-pre-ignition occurrence index table has set thereto:
   a positive pre-ignition occurrence index in a temperature range in which the pre-ignition is likely to occur; and
   a negative pre-ignition occurrence index in a temperature range in which the pre-ignition is less likely to occur.

7. A pre-ignition estimation/control device for an internal combustion engine according to claim 4, wherein the octane number-pre-ignition occurrence index table has set thereto:
   a positive pre-ignition occurrence index for an octane number at which the pre-ignition is likely to occur; and
   a negative pre-ignition occurrence index for an octane number at which the pre-ignition is less likely to occur.

8. A pre-ignition estimation/control device for an internal combustion engine according to claim 1, wherein the effective-compression-ratio-boundary calculation module calculates the boundary of the effective compression ratio from a pre-ignition occurrence index-effective compression ratio boundary map based on the total pre-ignition occurrence index obtained by the pre-ignition-occurrence-index correction module.

9. A pre-ignition estimation/control device for an internal combustion engine according to claim 8, wherein:
   the pre-ignition occurrence index-effective compression ratio boundary map has set thereto, in an X-Y coordinate system thereof:
      a minimum value and a maximum value of the pre-ignition occurrence index on an X axis; and
      a lower limit of the boundary of the effective compression ratio representing a condition that causes the pre-ignition likely to occur, and an upper limit of the boundary of the effective compression ratio representing a condition that causes the pre-ignition less likely to occur on a Y axis; and
   the effective-compression-ratio-boundary calculation module calculates the boundary of the effective compression ratio by linearly interpolating between the upper limit and the lower limit of the boundary of the effective compression ratio in the pre-ignition occurrence index-effective compression ratio boundary map based on the total pre-ignition occurrence index obtained by the pre-ignition-occurrence index correction module.

10. A pre-ignition estimation/control device for an internal combustion engine according to claim 1, wherein the intake-cam-phase-advance calculation module is configured to:
   calculate the phase advance of the intake cam from the operation condition;
   obtain a restriction value imposed on the phase advance of the intake cam from an effective compression ratio boundary-intake cam phase advance restriction value map based on the boundary of the effective compression ratio calculated by the effective-compression-ratio-boundary calculation module; and
   set the phase advance of the intake cam to the restriction value if the phase advance calculated from the operation condition is larger than the restriction value.

11. A pre-ignition estimation/control device for an internal combustion engine according to claim 10, wherein:
   the effective compression ratio boundary-intake cam phase advance restriction value map has set thereto, in an X-Y coordinate system thereof:
      a lower limit and an upper limit of the boundary of the effective compression ratio on an X axis; and
      an upper limit and a lower limit of the restriction value imposed on the phase advance of the intake cam on a Y axis; and
   the intake-cam-phase-advance calculation module obtains the restriction value imposed on the phase advance of the intake cam by linearly interpolating between the lower limit and the upper limit of the restriction value imposed on the phase advance on the effective compression ratio boundary-intake cam phase advance restriction value map based on the boundary of the effective compression ratio calculated by the effective-compression-ratio-boundary calculation module.

* * * * *